HIGH-VOLTAGE POWER SUPPLY REGULATION

Filed April 9, 1948

INVENTOR
Vernon J. Duke
BY
[signature]
ATTORNEY

Patented Dec. 4, 1951 2,577,112

UNITED STATES PATENT OFFICE 2,577,112

HIGH-VOLTAGE POWER SUPPLY REGULATION

Vernon J. Duke, Rockville Centre, N. Y., assignor to Radio Corporation of America, a corporation of Delaware Application April 9, 1948, Serial No. 19,963

1 Claim. (Cl. 315—14)

This invention is directed to electronic apparatus and particularly to television apparatus of the electronic variety. In the electronic apparatus for television transmission and reception, it is common practice to utilize cathode ray type tubes which employ the use of an electron beam which is caused to scan a target structure within an evacuated chamber. This electron beam is usually formed by an electron gun structure which defines the cross-sectional dimension of the beam and focuses it (by electrostatic or electromagnetic fields) upon the target structure with a current intensity which is primarily a function of the grid-cathode bias potential. The cathode ray beam velocity is determined by the accelerating potentials applied to the beam accelerating electrodes. In accordance with this latter requirement it is necessary to provide some source of relatively high D. C. potential in the order of several thousand volts which is applied to the accelerating electrodes of the particular type of cathode ray tube employed. These high voltage supplies may take several forms, but to date, economical and practical construction of such supplies usually results in a power supply having poor voltage regulation with respect to load demands.

Defective operation of television systems due to poor regulation characteristics of accelerating electrode high voltage supplies is most vividly apparent in the operation of kinescopes used in the reproduction of television pictures. It is well known that in the operation of the kinescope that should the high voltage accelerating potential applied to the beam vary in magnitude during electromagnetic or electrostatic deflection of the beam the extent of the angular deflection of the beam will also vary due to the change in deflection sensitivity accompanying the change in accelerating potential. Since the electron beam current in many cases constitutes the sole load upon the accelerating potential power supply, any variations in electron beam current due to modulation of this electron beam by signals applied to the kinescope will reflect a varying load upon the accelerating potential power supply. Accordingly, if the power supply does not have good voltage regulation characteristics with respect to load, the angular deflection of the beam will vary with the signal variation of beam current. Also it is to be noted that the focus of the electron beam upon the fluorescent screen of a television kinescope or like type of cathode ray tube is a function of the accelerating potential applied to the target and therefore if this accelerating potential is caused to change as the electron beam traverses the raster area, a variation in the line definition of the raster will necessarily result from the consequent change in focus of the electron beam.

The aforementioned effects of accelerating potential regulation on deflection sensitivity and proper focusing in a television kinescope type of tube is particularly noticeable in television receivers developing the necessary high voltage for the kinescope reproducing tube from a separate R. F. type power supply or a pulse type power supply associated with the horizontal deflection circuit. Although these types of power supplies are well constructed at considerable expense, it is well known that the inherent voltage regulation of such supplies is generally poor. Accordingly, this poor regulation commonly results in the reproduction of television pictures having variable dimensions dependent upon average beam current which in turn corresponds to the background level of television picture.

It is therefore the purpose of this invention to provide a method whereby the undesirable effects of poor voltage regulation in high voltage power supplies used as a source of accelerating potential for cathode ray type tubes can be substantially eliminated with need of little additional equipment and cost.

It is further a purpose of this invention to provide a method of controlling the magnitude of the output voltage of a high voltage generator used to supply electron beam accelerating potential to television kinescope type tubes in such a way as to obviate the changes in raster size and beam focus caused by poor regulation of the high voltage power supply.

It is further an object of this invention to provide the apparatus necessary to economically alter existing electronic equipment employing high voltage acceleration of electron streams such that improvements in performance may be realized through the elimination of inadequate accelerating power supply regulation characteristics.

A further purpose of this invention resides in the provision of the method and apparatus which may be applied to television receivers which eliminates change in raster size as produced upon the kinescope due to changes in background level of the video signal as may be present in systems having pulse type or R. F. type power supplies for the supply of said kinescope accelerating electrodes, these types of power supplies normally having inherently poor regulation characteristics.

The novel features which are believed to be characteristic of my invention are set forth in the appended claim. The invention itself, however, as to both its organization and method of operation, will best be understood through reference of the following description, especially when considered in connection with the accompanying drawings wherein:

Figure 1:
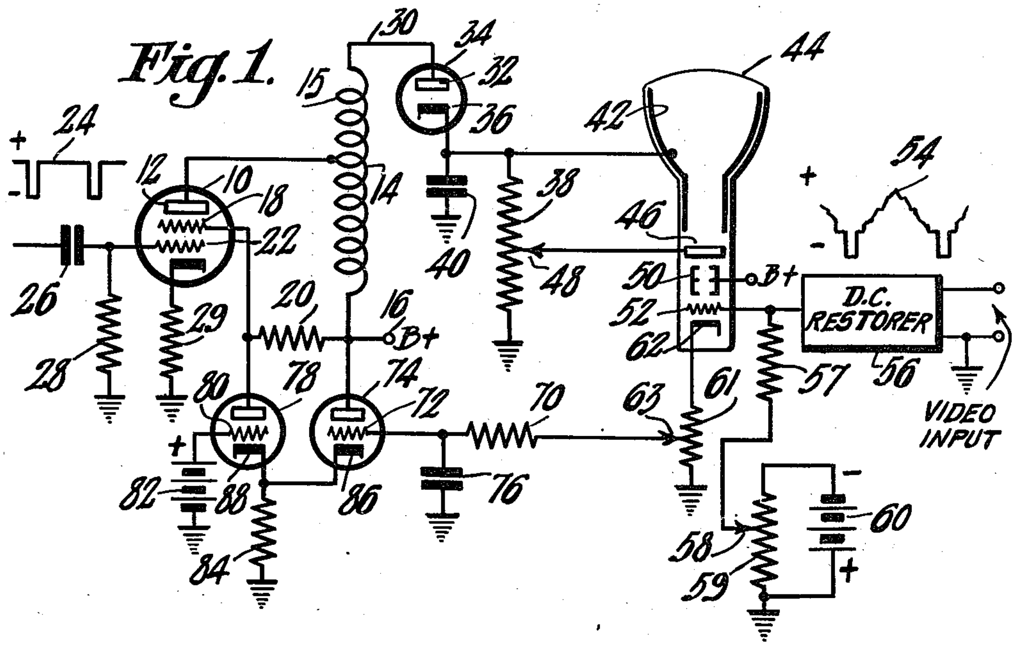
Figure 1 shows an embodiment of the invention.

Referring now to the accompanying drawing there is shown in Fig. 1 my invention as applied to a typical pulse type high voltage power supply as adapted to provide accelerating potential for television type kinescopes. The electron tube 10 has its plate element 12 connected to the low impedance winding of an auto-transformer 14 through which plate supply potential is supplied from source 16. The screen grid 18 of electron tube 10 is also connected to the positive potential source 16 through dropping resistor 20 which effects a reduction in voltage applied to the screen element 18 under that of the full positive power supply potential 16. In accordance with the operation of this unit which will later be described, the control grid 22 of the electron tube 10 may be supplied with a series of pulses 24 which are capacitively coupled through condenser 26. A control grid return resistor 28 is shown connected from grid 22 to ground. Suitable bias for the grid 22 may be obtained by means of cathode dropping resistor 29.

The high impedance end 30 of the auto-transformer winding 14 is connected to plate 32 of rectifier tube 34 which has its cathode 36 connected through bleeder resistor 38 to ground. Also connected from the cathode 36 to ground is filter capacitor 40 which serves as a filter and storage capacitor for the rectifying tube 34. The cathode 36 is further connected to the high voltage accelerating terminal 32 of the kinescope 44 in a conventional manner. The focusing electrode 46 of the kinescope is connected to a tap 48 on high voltage bleeder 38 and the first anode-electrode 50 supplied with a suitable positive voltage necessary for the proper operation of the kinescope. In a conventional manner the control grid 52 of the kinescope 44 is supplied with a video signal 54 which has its D. C. component restored through a suitable form of a D. C. restoration circuit indicated in block form at 56, the configurations and operation of such circuits being well known to the art. A simple form of brightness control is provided for the kinescope by returning control grid 52 through grid leak resistor 57 to the sliding tap 58 on potentiometer 59 which is connected across a voltage source 60. Since the positive terminal of source 60 is grounded, a variable negative bias is applied to grid 52 by adjusting the tap 58 on potentiometer 59, hence providing conventional kinescope brightness control action. The cathode current of kinescope 44 is adapted to produce a voltage drop across tapped resistor 61 placed in series with the circuit from the kinescope cathode 62 and ground.

The voltage drop appearing across a portion of dropping resistor 61 in the cathode circuit of the kinescope is applied through an isolating resistor 70 to the grid 72 of electron tube 74. Capacitor 76 is connected from the control grid 72 to ground and provides an R. C. time delay network in cooperation with resistor 70. Amplifier tube 74 operates in conjunction with amplifier tube 78 as a cascaded cathode follower-grounded grid type of D. C. amplifier. Grid 80 of electron tube 78 is supplied with a suitable positive D. C. potential 82 to permit operation of the tube on a proper portion of its transfer characteristic curve and is required because of the somewhat larger voltage drop usually appearing across the common cathode load resistor 84 which is connected to the cathode 86 and 88 of the electron tubes 78, 74 respectively.

The operation of the pulse type power supply shown in Fig. 1 so as to produce a high voltage D. C. source conforms to common usage in every respect. The amplifier tube 10 in its unexcited state is allowed to pass a nominal plate current whose magnitude is established by the value of self bias imposed by cathode resistor 29 in combination with the value of screen voltage applied to screen grid 18. This plate current necessarily passes through the low impedance winding of the auto-transformer 14 to the B supply terminal 16. The control grid of the amplifier tube 10 is supplied with a series of pulses 24 which have sufficient amplitude in the negative direction to establish plate current cutoff in the vacuum tube 10 during the durations of the more negative extents of the pulses. Since plate current is permitted to flow during the positive extents of the signal 24 this sharp transition from plate current to no plate current in the inductive winding of auto-transformer 14 produces a transient having a relatively steep wave front. This is, in effect, equivalent to the sudden stoppage of current through an inductance which, according to well known principles, causes a rise in voltage across the terminals of such an inductance which is proportional to the inductance and to the rate of change in the current through the inductance. Hence, the vacuum tube 10 operates as a form of switch which is given an equivalent high rate of action or short opening time through the steepness of the pulse contours applied to its control grid. Typical circuits operating with a B supply voltage in the neighborhood of two or three hundred volts may, during the plate current cutoff cycle of the tube 10, produce transient voltages in the order of several thousand volts on the plate 12 of the vacuum tube 10. It is evident that during the transient occurring in the low impedance primary of the auto-transformer 14, that additional voltage will be induced in the higher impedance secondary 15 of said transformer. This secondary winding is so arranged that the voltage appearing from plate 32 of rectifier tube 34 to ground is the sum of the self induced high voltage peaks in the primary 14 and the mutally induced voltage in the secondary winding 15. This additive relation of the windings causes the voltage appearing from plate 30 to ground to be in the order of ten thousand volts or more, whereas the B power supply potential may be only two to three hundrd volts. Necessarily the voltage transients appearing across the entirety of the auto-transformer will be acting across a resonant circuit comprised of the inductance of the entire transformer winding in parallel with the stray capacity effectively across its terminals. Thus, the transients induced through the amplifier tube 10 in the autotransformer will tend to develop a series of damped waves having the above recited high voltage amplitude. Rectifier tube 34 is so connected to rectify the positive portion of these damped wave trains and thereby produce across bleeder resistor 38 a high D. C. voltage which may be in the order of several thousand volts or more. Filter capacitor 40 connected from the cathode 36 to ground of the vacuum tube 34 reduces the amount of ripple due to the periodicity of the control pulses applied to the grid 22 of the vacuum tube 10.

The magnitude of the voltage appearing across the bleeder resistor 38 of course can be controlled by the value of the screen potential applied to the vacuum tube 10, since proper selection of the screen potential will permit the tube to operate on different portions of its plate current characteristics and hence impart different rates of current change to the primary 14 of the autotransformer for a given pulse contour applied to the tube control grid.

With the above operation in mind which successively produces a high voltage D. C. potential of a magnitude suitable for application to a high voltage accelerating electrode 42 of a kinescope, such as 44, it is evident that should it be desired to adjust the value of the high voltage so applied, it will be necessary only to establish a control of the magnitude of the D. C. voltage applied to the screen grid 18 of the vacuum tube 10. The kinescope 44 is shown in Fig. 1 to be conventionally connected in a manner which would be useful in the reproduction of television images. Focusing electrode 46 of the kinescope is supplied with the proper high voltage potential by means of tap 48 on high voltage bleeder 38. The first anode potential of the kinescope may be applied to first anode 50 by connection to the common B supply for the equipment, while control grid 52 is supplied with a video signal 54 through the D. C. restorer circuit 56. For simplicity in illustration, deflection means for the kinescope are not shown since they are not functional in the operation of this invention.

As before pointed out, the control grid 52 of the kinescope 44 is connected to permit its placement at variable negative D. C. potentials below ground which is derived from supply source 60 through tap 58 on potentiometer 59. This control establishes the background level for the picture reproduced by the tube and serves as the commonly known brightness control for the kinescope. As before noted, in series with the cathode 62 and ground is placed series potentiometer 61 which is provided with an adjustable arm 63. Since the cathode current of modern kinescopes consists almost entirely of the electron beam current produced by the electron gun the voltage drop across potentiometer 61 will be proportional to the beam current of the kinescope. Thus, as the kinescope beam current increases thereby imposing a varying load upon the high voltage system and causing the accelerating potential applied to electrode 42 to lower in value due to the inherent poor regulation of such a supply, compensation for such increase beam current may be made by increasing the value of the screen potential of amplifier tube 10. This may be automatically accomplished by means of the control tubes 74 and 78 having the following action:

As the beam current increases the potential between potentiometer tap 63 and ground increases in a positive direction and, through isolating resistor 70, this potential increase is applied to the control grid 72 of vacuum tube 74. Vacuum tube 74 is seen to be connected as a cathode follower type of amplifier and therefore its cathode 86 also becomes more positive with respect to ground. This increase in voltage from cathode to ground is imposed upon the input circuit of amplifier tube 76 by merit of the cathode impedance 84 common to the two tubes. Grounded grid amplifier 78 is shown to have its grid 80 placed at a positive potential with respect to ground by a voltage source 82. This positive value of bias subtracts from the negative bias imposed on the grid 80 by merit of the voltage drop across cathode resistor 84 which is established mainly by the plate current of vacuum tube 74. Thus, the tube 78 may be operated on a portion of its characteristics such that an increase in cathode potential occasioned by a positive swing of its cathode 88 will cause the plate current through dropping resistor 20 substantially to decrease. This decrease in plate current 78 will cause the IR drop across resistor 20 to decrease and thereby increase the voltage effective at the screen 18 of amplifier tube 10. As heretofore described, this increase in screen voltage will cause the high voltage output appearing across electrode 42 and ground to increase. It is seen therefore by proper adjustment of potentiometer tap 63 the circuit may be made to operate so that the poor regulation characteristics of the power supply may be compensated by the increase in screen voltage caused by the amplified version of the voltage drop across a selected portion of resistor 61. Condenser 76 cooperates with the resistor 70 to form a time delay network which may be desirable to prevent the regulating system from responding to instantaneous changes in kinescope cathode current. The value of this time constant may be adjusted to suit individual needs and circumstances.

Figure 2:
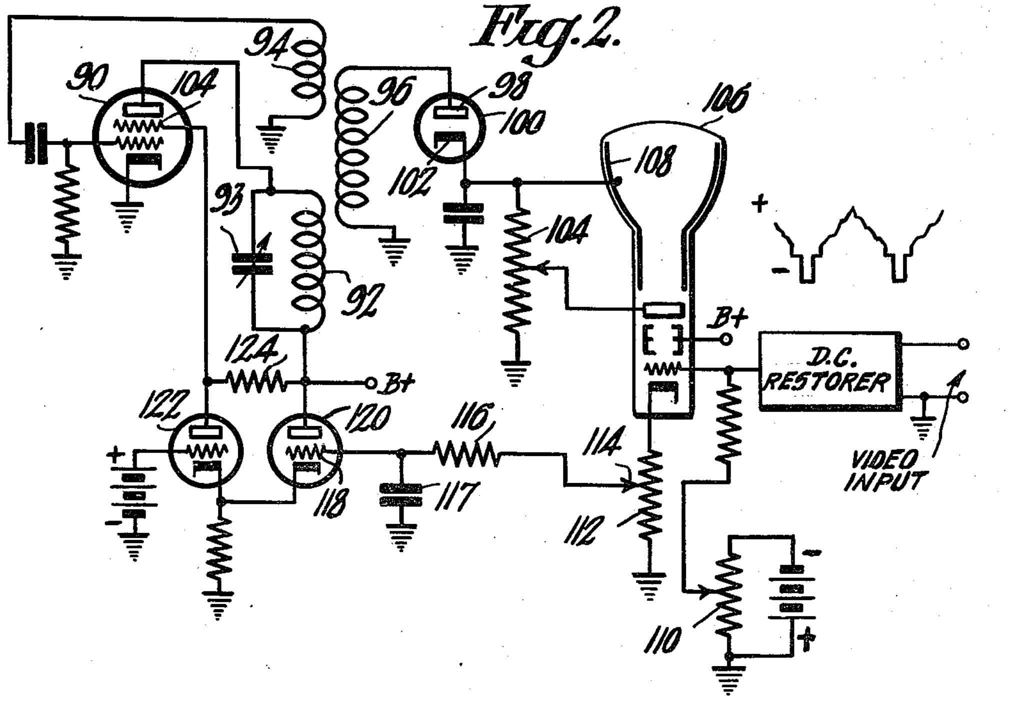
Figure 2 shows another embodiment of the invention.

The embodiment of my invention shown in Fig. 2 is similar in operation to the arrangement shown in Fig. 1. However, in Fig. 2 my invention is shown applied to a high voltage supply of the R. F. type such as described, for example, in a U. S. Patent No. 2,374,781, to Schade, dated May 1, 1945. The power amplifier tube 90 is operated as a self-excited oscillator by means of plate coil 92 which is disposed to excite the grid tickler coil 94 and cause sustained oscillation of the circuit. A high impedance winding 96 is placed in mutually inductive relationship with primary winding 92 so as to produce a high voltage across the plate 98 of vacuum tube rectifier 100 having its cathode 102 connected to ground through high voltage bleeder resistor 104. The frequency of the oscillator may be adjusted by means of variable capacitor 93 which is used to tune the primary 92 (oscillator tank circuit) of the R. F. transformer. Detailed operation of this circuit is described fully in the aforementioned patent to Schade. It is sufficient to note in connection with the present invention that the value of the potential applied to the screen grid 104 of vacuum tube 90 effects control of the voltage to ground appearing across the plate 98 of vacuum tube 100. This action follows by merit of vacuum tube 90 being operated as a class "C" oscillator wherein plate current flows for only a portion of the entire period of oscillation. As in the previous embodiment the kinescope 106 has a high voltage accelerating potential applied to its accelerating electrode 108 from this high voltage power supply whose normal regulation characteristics are inherently and undesirably poor. The kinescope 106 is provided with a brightness control 110 and a cathode dropping resistor potentiometer 112 which has tap 114. The voltage appearing across tap 114 and ground which is proportional to the cathode current of the kinescope 106 is applied through resistor 116 to the control grid 118 of vacuum tube 120. As heretofore explained, in connection with Fig. 1, this D. C. voltage applied to the control grid 118 causes a change in the potential applied to screen grid 104 of oscillator tube 90. Accordingly, as the beam current through the kinescope 104 increases, the control grid 118 is caused to swing more positively which, in turn, obtains a reduction in the plate current of vacuum tube 122. This plate current reduction causes the voltage drop across plate resistor 124 to decrease, thereby increasing the voltage applied to the screen 104. This increase in screen potential then causes an increase of energy to be applied to the high voltage system which is sufficient to cause the voltage across the accelerating electrode 108 to ground to remain substantially constant regardless of kinescope beam current changes. Again the degree of compensation may be adjusted by positioning of potentiometer tap 114 on potentiometer 112 and suitable delay action may be incurred through the section of the time constant of condenser 117 and isolating resistor 116.

I have found that in the proper adjustment of my invention as applied to the general forms above described, it is most expeditious to adjust the taps 63 and 114 on control potentiometers 60 and 112 respectively (shown in Figs. 1 and 2) while repeatedly adjusting the brightness controls 59 and 110 respectively throughout their entire ranges. The aforementioned adjustments are made while watching the raster produced on the television kinescope screen. The degree of high voltage power supply compensation control is established at a level which will maintain the raster size constant for all settings of the brightness control. Although this adjustment procedure is only useful in applications of the kinescope for television purposes, it is to be preferred in such applications over that of applying a high resistance voltmeter between the kinescope accelerating electrode and ground, since in most cases such a voltmeter would impose an additional load upon the power supply system to an extent which would render void any adjustments for constancy of accelerating potential with respect to brightness control setting for conditions when the voltmeter was removed.

While I have illustrated two embodiments of my invention in connection with television kinescopes employing electrostatic focusing, other modifications and applications will readily occur to those skilled in the art. I do not therefore desire my invention to be limited to the particular embodiments illustrated and described and I contemplate by the appended claim to cover all modifications which fall within the spirit and scope of my invention.

What I claim as new and desire to secure by Letters Patent of the U. S. is:

Cathode ray tube apparatus comprising a cathode ray tube, a space discharge tube having a cathode, an anode, a control electrode and a screen electrode, means for supplying pulses to said control electrode for periodically biasing said tube to cutoff, an autotransformer, the anode circuit of said tube including a portion of the winding of said autotransformer, a rectifier having a cathode and an anode, a connection from said autotransformer to the anode of said rectifier, a connection from said rectifier cathode to an electrode of said cathode ray tube, an electron emitting electrode in said cathode ray tube, an impedance in circuit with said electron emitting electrode, a direct current amplifier, a connection from said impedance for controlling said direct current amplifier, a control tube having at least a cathode and an anode, means for coupling said control tube to said direct current amplifier, means for applying a positive potential from a source of positive potential to the screen electrode of said first named tube including an impedance between said source and said electrode, a connection from the anode of said control tube to the screen electrode of said first named tube, whereby said control tube is operative to vary the potential on said screen electrode in accordance with operation of said cathode ray tube.

VERNON J. DUKE.

REFERENCES CITED

The following references are of record in the file of this patent:

UNITED STATES PATENTS

| Number | Name | Date |
|---|---|---|
| 2,122,990 | Poch | July 5, 1938 |
| 2,173,221 | Ballard | Sept. 19, 1939 |
| 2,219,194 | Mynall | Oct. 22, 1940 |
| 2,255,485 | Dome | Sept. 9, 1941 |
| 2,265,620 | Bahring | Dec. 9, 1941 |
| 2,302,876 | Malling | Nov. 24, 1942 |
| 2,371,897 | Knick | Mar. 20, 1945 |
| 2,443,030 | Foster | June 8, 1948 |